United States Patent [19]

Gaonkar

[11] Patent Number: 5,332,595
[45] Date of Patent: Jul. 26, 1994

[54] STABLE MULTIPLE EMULSIONS COMPRISING INTERFACIAL GELATINOUS LAYER, FLAVOR-ENCAPSULATING MULTIPLE EMULSIONS AND LOW/NO-FAT FOOD PRODUCTS COMPRISING THE SAME

[75] Inventor: Anilkumar G. Gaonkar, Vernon Hills, Ill.

[73] Assignee: Kraft General Foods, Inc., Northfield, Ill.

[21] Appl. No.: 972,873

[22] Filed: Nov. 5, 1992

Related U.S. Application Data

[63] Continuation of Ser. No. 670,713, Mar. 18, 1991, Pat. No.

[51] Int. Cl.$^5$ ............................................. A23D 7/00
[52] U.S. Cl. ................................... 426/602; 426/601; 426/650; 426/651
[58] Field of Search .................. 426/601–607, 426/611, 531, 533, 534, 519, 573, 575, 576, 612, 650, 651

[56] References Cited

U.S. PATENT DOCUMENTS

| | | | |
|---|---|---|---|
| 3,917,859 | 11/1975 | Terada et al. | 426/602 |
| 4,273,790 | 6/1981 | Bosco et al. | 426/335 |
| 4,310,554 | 1/1982 | Olson et al. | 426/40 |
| 4,366,180 | 12/1982 | Altrock et al. | 426/602 |
| 4,590,086 | 5/1986 | Takahashi et al. | 426/602 |
| 4,626,443 | 12/1986 | Takahashi et al. | 426/602 |
| 4,626,444 | 12/1986 | Takahashi et al. | 426/602 |
| 4,632,840 | 12/1986 | Takahashi et al. | 426/602 |
| 4,650,690 | 3/1987 | Bams et al. | 426/602 |
| 4,714,566 | 12/1987 | Takahashi et al. | 426/602 |
| 4,933,192 | 6/1990 | Darling et al. | 426/98 |
| 4,971,721 | 11/1990 | Takahashi et al. | 426/602 |
| 4,985,173 | 1/1991 | Takahashi et al. | 426/602 |
| 4,988,456 | 1/1991 | Takahashi et al. | 426/602 |
| 5,011,701 | 4/1991 | Baer et al. | 426/602 X |

OTHER PUBLICATIONS

Fennema, O. R., 1985, Food Chemistry, pp. 169–175, 678, 679, Marcel Dekker, Inc., New York.

Florence, et al., "The Formulation and Stability of Multiple Emulsions", 11 International J. of Pharmaceutics, 277–308 (1982).

Matsumoto, et al., "Preparation of W/O/W Emulsions in an Edible Form on the Basis of Phase Inversion Technique", 6 J. Dispersion Science and Technol. 507–521 (1985).

Matsumoto, et al., "A Preliminary Study of W/O/W Emulsions with a View to Possible Food Applications", 12 J. Texture Studies 243–257 (1981).

Oza, et al., "Multiple Emulsions Stabilized by Colloidal Microcrystalline Cellulose", 10 J. Dispersion Science and Technology 163–185 (1989).

Primary Examiner—Donald E. Czaja
Assistant Examiner—Leslie Wong
Attorney, Agent, or Firm—Fitch, Even, Tabin & Flannery

[57] ABSTRACT

Very stable W/O/W and O/W/O multiple emulsions which include a substantially continuous gelatinous membrane at an aqueous/oil interfacial region of the emulsions are provided. Particularly preferred gelatinous membrane-containing multiple emulsions are prepared in methods employing an aqueous phase comprising an aqueous soluble/gellable polysaccharide and a lipid phase comprising a metal cation-containing compound, wherein the metal cation salt of the aqueous soluble polysaccharide is a gel. Also provided are W/O/W multiple emulsions having an ethylcellulose-containing oil phase, which emulsions exhibit improved stability at temperatures between 0° C. and 10° C. W/O/W or O/W/O multiple emulsions having a concentrated aqueous-soluble flavor or a concentrated all-soluble flavor encapsulated in the internal phase are also provided, as well as low- or no-fat food products containing such concentrated-flavor encapsulating emulsios, which food products exhibit enhanced flavor perception and extended shelf-life.

43 Claims, No Drawings

STABLE MULTIPLE EMULSIONS COMPRISING INTERFACIAL GELATINOUS LAYER, FLAVOR-ENCAPSULATING MULTIPLE EMULSIONS AND LOW/NO-FAT FOOD PRODUCTS COMPRISING THE SAME

This application is a continuation of application Ser. No. 670,713, filed Mar. 18, 1991, now abandoned.

The present invention is related to water-in-oil-in-water ("W/O/W") and oil-in-water-in-oil ("O/W/O") multiple emulsions. The present invention more specifically relates to W/O/W and O/W/O multiple emulsions which comprise a gelatinous layer formed at an aqueous/oil interfacial region of a such multiple emulsions for enhancing their stability and to methods for preparing such multiple emulsions.

The present invention also relates to W/O/W and O/W/O multiple emulsions which comprise a flavor composition solubilized in the internal phase thereof and to low-fat and no-fat food products comprising such flavor-encapsulating multiple emulsions.

BACKGROUND OF THE INVENTION

Multiple emulsions may generally be categorized into one of two types: water-in-oil-in-water emulsions which are water continuous and oil-in-water-in-oil emulsions which are oil continuous. In each case the internal and external phases are alike and an intermediate phase separates the two like phases. The intermediate phase would normally be immiscible with the two like phases. Viewed in another way, water-in-oil-in-water multiple emulsions have a continuous external aqueous phase, in which is dispersed a lipid phase, which lipid phase has dispersed therein a internal aqueous phase. And oil-in-water-in-oil multiple emulsions have a continuous external lipid phase, in which is dispersed an aqueous phase, which aqueous phase has dispersed therein an internal lipid phase.

An important area of research concerning multiple emulsions has been directed largely to the problem of inherent instability of such systems. In the case of W/O/W emulsions, there is breakdown of the emulsion where discontinuities in the lipid phase permit the separated aqueous phases to coalesce. An analogous breakdown problem exists with O/W/O emulsions. Increasing the concentration of lipophilic emulsifier in the intermediate lipid phase of W/O/W emulsions or the concentration of hydrophilic emulsifier in the intermediate aqueous phase of O/W/O emulsions may tend to increase the integrity of the aqueous/oil interface, depending on type and amount of emulsifier employed, but notwithstanding increased concentrations of lipophilic or hydrophilic emulsifier, W/O/W and O/W/O emulsions tend to coalesce upon standing, particularly when stored at refrigerator temperatures. Moreover, increased concentrations of emulsifiers may be unacceptable for use in food emulsions and pharmaceutical delivery applications, where such concerns as off-flavors caused by emulsifiers, or FDA regulations, pragmatically limit the type and concentration of emulsifier which can be used. It would therefore be extremely desirable to provide multiple emulsions which are very stable to coalescence with aging and/or storage, even at refrigerator temperatures, which emulsions may be made using relatively low concentrations of emulsifiers.

With respect to food technology, considerable research effort has been expended on developing reduced fat food products which have low oil content, particularly aqueous based products which have low or substantially no fat content. Significant advances have been made in reducing fat and oil content of various food products through the use of, for example, water-in-oil emulsions or water-in-oil-in-water emulsions, wherein water occupies volume which otherwise would have been occupied with oil, thereby commensurately reducing the amount of oil in an oil-containing food product. For example, Takahashi et al., U.S. Pat. Nos. 4,632,840, 4,626,443 and 4,626,444 disclose reduced fat salad dressing having a W/O/W emulsion base. Such salad dressings nevertheless still have about 30% oil by weight. Further fat reductions have been obtained using, as fat mimetics, novel carbohydrate/protein complexes such as those disclosed in PCT International Application Publication No. WO 89/10068 or microreticulated microcrystalline cellulose as disclosed in U.S. Pat. No. 5,011,701. Such carbohydrate/protein complexes or microreticulated microcrystalline cellulose are particularly useful in providing no-fat food products such as viscous and pourable salad dressings and the like having fat-like organoleptic characteristics.

While elimination or substantial reduction of oil content is attainable, such low-fat or no-fat products characteristically lack (or lose during storage) the desirable flavor perception possessed by their high-fat counterparts. Stabilization of aqueous soluble or lipid soluble flavors in low- or no-fat, aqueous-based food products has not received much attention. Heretofore, aqueous soluble flavors have merely been added along with other aqueous soluble ingredients to produce low- or no-fat food products; with respect to reintroducing fat-soluble flavors to reduced-fat products, Singer, PCT International Application Publication WO 90/00354 discloses adding to such low-fat and no-fat foods fat globules containing concentrated fat soluble flavoring to simulate the organoleptic affect of fat-rich food products. In each of these cases the flavors are in contact with the aqueous-based food vehicle environment (either directly or at the interface between the fat globules and the aqueous base of the food vehicle) and thereby may be adversely affected. Flavor perception in low- or no-fat food products containing soluble flavors simply mixed into the aqueous-based food vehicle, e.g. viscous or pourable salad dressings or the like, rapidly deteriorates presumably due to interaction of flavors with the aqueous base, giving such products a short shelf life. It would therefore be desirable to provide aqueous-based food products (especially no-fat products) which have aqueous or oil soluble flavor components stably maintained so as to protect the flavors from volatilization, oxidation and other undesirable events, during extended storage, while at the same time providing for ready release of such flavors, with good organoleptic characteristics, when such low/no-fat food products are eaten.

In view of the above, it is an object of the present invention to provide very stable W/O/W and O/W/O multiple emulsions which utilize reduced amounts of emulsifiers, which multiple emulsions are suitable for food emulsion technology, as well as other applications utilizing multiple emulsions. It is also an object of the present invention to provide flavor-delivering compositions which are stably maintained in low-fat or no-fat products, such that the flavors are protected from the aqueous-based food vehicle environment until the food product is eaten, whereupon the flavor is readily released to yield a desirable taste perception and mouthfeel. These and other objects of the invention will become apparent from the following detailed description.

SUMMARY OF THE INVENTION

Very stable W/O/W and O/W/O multiple emulsions are provided which include a gelatinous layer at the interfacial region between an internal aqueous or oil phase and an intermediate oil or aqueous phase, respectively, of the multiple emulsion. The gelatinous membrane acts as a physical barrier to coalescence. Interfacial gel layers are formed in situ when an aqueous soluble/gellable composition solubilized in an aqueous phase is contacted by a gel promoting agent which is generally associated with a lipid soluble surface active agent. The gel promoting agent is thereby capable of being presented to the aqueous phase so as to cause formation of a gelatinous layer at the water/oil interface. Preferably, in situ gellation occurs in a reaction between a sodium salt of a polysaccharide and a polyvalent metal cation provided by a lipophilic surface active agent. Particularly preferred embodiments of the present invention involve W/O/W or O/W/O multiple emulsions having a calcium alginate layer which is formed at or near the interface of the internal (aqueous or oil) and the intermediate (oil or aqueous) phases. The W/O/W multiple emulsions of the present invention exhibit superior stability even where such multiple emulsions are made using as low as 1.5 weight percent lipophilic emulsifier and are especially useful for food technology and other applications calling for such multiple emulsions. The present invention also concerns methods for making such W/O/W and O/W/O multiple emulsions.

Furthermore, the present invention provides multiple emulsions (and methods for making same), which emulsions comprise concentrated aqueous soluble or oil soluble flavors encapsulated substantially exclusively within the internal phase of W/O/W or O/W/O multiple emulsions. Optionally, aqueous or oil soluble flavors may be incorporated into the intermediate phase of O/W/O or W/O/W multiple emulsions, respectively. Such flavor encapsulating multiple emulsions may be readily incorporated into low-fat or no-fat food products such as salad dressings, spreads, sauces, frozen desserts and the like to provide excellent flavor perception and extended shelf life. Low- or no-fat food products comprising concentrated flavors so encapsulated, which emulsions may optionally comprise an interfacial gel layer, have desirable organoleptic characteristics and exhibit substantially instantaneous flavor release when the flavor encapsulating emulsions are disrupted by forces exerted in the mouth by the tongue and teeth. The encapsulated flavors are present in a highly concentrated form which facilitates stability of the flavors, particularly aqueous soluble flavors which may be volatile. Addition of 1-10 weight percent of the concentrated-flavor-encapsulating multiple emulsions adds only a relatively small amount of oil to the food product —preferably less than 0.5 grams per serving—while advantageously extending shelf life thereof.

DETAILED DESCRIPTION OF THE INVENTION

The present invention in several of its aspects is generally directed to very stable multiple emulsions having a substantially continuous gelatinous layer formed in the interfacial region between the internal and intermediate phases and to methods for making such emulsions. The present invention also concerns water-in-oil-in-water multiple emulsion comprising an ethylcellulose-containing oil phase, which multiple emulsion exhibit superior stability at low temperatures. The present invention in several of its aspects also pertains to multiple emulsions which have solubilized in their internal phase a flavor composition as well as low- or no-fat food products comprising such flavor-encapsulating multiple emulsions.

As used herein a "W/O/W emulsion" means a water-in-oil-in-water "double" or "multiple" emulsion wherein droplets of an internal aqueous phase are dispersed within an oil phase, which oil phase is in turn dispersed within a continuous, external aqueous phase.

An "O/W/O emulsion" as used herein means an oil-in-water-in-oil "double" or "multiple" emulsion wherein droplets of an internal oil phase are dispersed within an aqueous phase, which aqueous phase is in turn dispersed within a continuous, external oil phase.

As used herein the term "lipid" means an oil or fat, including hydrogenated or fractionated versions thereof, as well as fat substitutes and combinations of these lipids. The terms lipid phase and oil phase are used interchangeably herein. Also, as well known in the art, suitable oils for food technology application are edible oils such as triglyceride oils, whereas mineral oils are generally used for pharmaceutical applications.

A "gelatinous layer" as used herein with respect to W/O/W emulsions defines at its outer periphery the internal aqueous/oil interfacial region. The gelatinous layer as used herein may also be referred to as a gelatinous membrane. A gelatinous layer or membrane of a W/O/W emulsion generally defines at its inner periphery the liquid internal aqueous compartment(s) of the emulsions, although it is also contemplated that in certain applications it may be desirable to cause the gelatinous layer to extend throughout the entire internal aqueous phase. In O/W/O emulsions, the gelatinous layer generally defines the outer periphery of the internal lipid phase and may also be so extensive as to gel the entire intermediate aqueous phase. In any event the gelatinous layer should provide a substantially continuous barrier or shell which defines the outer boundaries of the internal phase of a multiple emulsion. The extent and thickness of such gelatinous layer may be varied by adjusting the concentrations of the aqueous soluble/gellable composition and the gel promoting agent as will be clear to the ordinarily skilled in light of the teachings of this specification. Continuity of the gel layer is important to achieving stability of the multiple emulsions of the invention. A gelatinous layer may comprise monomeric units which are ionically or covalently bonded.

The gelatinous layer which comprises the multiple emulsions of the present invention preferably is formed in situ, in the region of the aqueous/oil interface, after the aqueous and lipid phases have been emulsified. Gel formation is caused to occur where an aqueous soluble/gellable composition present in the aqueous phase contacts a gel promoting agent provided by the lipid phase.

An "aqueous soluble/gellable polysaccharide" as used herein means a polysaccharide which is soluble in an aqueous solution and may be selectively caused to form a gel. Examples include alginates, carrageenans, chitosans, and like polysaccharides.

A "gel promoting agent" as used herein, is a composition which causes an aqueous soluble/gellable composition to gel. Examples of "gel promoting agents" which may cause gellation of aqueous soluble/gellable polysaccharides include but are not limited to metal cations such as calcium, copper, zinc, iron and the like. One example of a gel which forms in the presence of monovalent metal cation, however, is the potassium salt of kappa carrageenan. Also, acid (i.e., hydrogen ions) may gel aqueous soluble/gellable polysaccharides. Aqueous soluble/gellable polysaccharides are generally soluble in their sodium salt form.

As used herein the term "flavor" or "flavoring" means a composition which elicits the effect perceived by the senses as the resultant action of one or more natural or synthetic flavoring ingredients. As such, flavor is a product of a physiological reaction contributed by aroma, taste, texture and appearance. See, Fenaroli's *Handbook of Flavor Ingredients,* Second Edition CRC Press, Inc., Cleveland, Ohio (1975).

Aqueous soluble and oil soluble natural and artificial flavors are well known in the art. Natural flavor compositions may be isolated, for example, from meat, fish, eggs, vegetables, fruit and the like, as well known in the art. Generally, the person of skill in the art of food technology may find it expedient to purchase natural and/or artificial flavor compositions from any of several commercial sources such as Bell Flavors and Fragrances (Northbrook, Ill.), Fritzsche, Dodge & Olcott (New York, N.Y.), Fries and Cino ("F&C" Cincinnati Ohio) Fries and Fries (Cincinnati, Ohio), Internatational Flavors and Fragrances (New York, NY). These and other commercial sources are well known to those in the art.

As used herein the terms "aqueous soluble flavor" and "oil soluble flavor" refer to flavor compositions wherein at least about 70%, and preferably more than 98%, of the composition is soluble in an aqueous solution or an oil, respectively. Upon solubilization of the flavor composition, amounts of insoluble flavor components which may be dispersed and suspended in an aqueous or oil phase are generally not objectionable so long as the dispersed particles do not adversely affect the formation and integrity of the emulsion.

By a "concentrated" solution of a flavor it is meant that an encapsulated flavor component is present in the multiple emulsion (W/O/W or O/W/0) in a sufficient amount to impart the desired flavor to the low- or no-fat food product, using at most about 20%, preferably about 3%-6% by weight of the multiple emulsion of the invention such that the low- or no-fat product has a taste perception comparable to that of its fat-rich counterpart. For example, where the internal phase of a W/O/W or O/W/O multiple emulsion comprises about 30% of the multiple emulsion by weight (the range is from about 10% to about 50%), and where one or more flavors are encapsulated in the internal phase, and where about 3-6 weight percent of flavor-encapsulating multiple emulsion (based on the total weight of the food product) is used to flavor the food product, flavor containing internal phase of the emulsion comprises only about 1-2 weight percent of the final low- or no-fat product. Therefore, in accordance with the present invention concentrated flavor compositions are generally concentrated from about 10-fold to about 350-fold, more preferably from about 50-fold to about 100-fold (in the encapsulating phase of the multiple emulsion) as compared to the concentration of the flavor(s) in a food vehicle base of a like food product which has the flavors merely added in with other ingredients.

In one aspect, the present invention entails a W/O/W or O/W/O multiple emulsion, respectively, having an internal aqueous phase or internal lipid phase, dispersed in an intermediate lipid phase comprising an emulsifying-effective amount of a lipophilic emulsifier or an intermediate aqueous phase comprising an emulsifying-effective amount of a hydrophilic emulsifier and having a substantially continous gelatinous layer formed at the aqueous/lipid interfacial region, the intermediate lipid or aqueous phase being in turn dispersed in an external aqueous phase or external lipid phase of the multiple emulsion, said gelatinous layer of the multiple emulsion having sufficient continuity to inhibit coalescence of the internal and external aqueous phases.

In another aspect, the invention concerns methods for making W/O/W or O/W/O multiple emulsions having a gelatinous layer formed in situ at the interface between the internal aqueous or lipid phase and the intermediate lipid or aqueous phase, which method comprises forming a primary water-in-oil emulsion or oil-in-water emulsion which has an aqueous phase which comprises an aqueous soluble/gellable composition and an oil phase which includes a gel promoting agent, and emulsifying said primary emulsion with an aqueous solution or lipid, respectively, to form a water-in-oil-in-water or an oil-in-water-in-oil multiple emulsion having a substantially continuous gelatinous layer in the region of the internal aqueous/oil or internal oil/aqueous interface.

In another aspect, the present invention concerns W/O/W multiple emulsions having an internal aqueous phase which is dispersed in an intermediate lipid phase comprising an emulsifying-effective amount of a lipophilic emulsifier, the lipid phase being dispersed in an external aqueous phase, said lipid phase further comprising an amount of ethylcellulose effective for stabilizing the multiple emulsion.

In a further aspect, the present invention involves (1) W/O/W multiple emulsions having an internal aqueous phase which comprises at least one aqueous soluble flavor, said internal aqueous phase being dispersed within an edible oil phase comprising an effective amount of a lipophilic emulsifier, said oil phase being dispersed in a continuous external aqueous phase comprising a hydrophilic emulsifier and (2) O/W/O multiple emulsions having an edible internal oil phase comprising at least one oil soluble flavor, said internal oil phase being dispersed within an aqueous phase comprising an effective amount of a hydrophilic emulsifier, said aqueous phase being dispersed in a continuous external oil phase comprising a lipophilic emulsifier.

In another aspect, the invention is directed to a low-fat or no-fat food product comprising from about 80 to about 99 weight percent of a low-fat or no-fat food product vehicle and from about i to about 20 weight percent of a flavor-encapsulating W/O/W or O/W/O multiple emulsion, said at least one flavor being contained substantially exclusively within the internal phase of said multiple emulsion.

In a still further aspect, the invention involves a method for encapsulating an aqueous soluble or oil soluble flavor, the method comprising (A) emulsifying (1) a first aqueous phase which comprises at least one concentrated aqueous soluble flavor and an edible lipid comprising an effective amount of a lipophilic emulsifier to yield a primary water-in-oil ("W/O") emulsion which has said aqueous flavor- containing phase dispersed within said lipid phase or (2) emulsifying a first lipid phase which comprises at least one concentrated oil soluble flavor and an aqueous solution comprising an effective amount of a hydrophilic emulsifier to yield a primary oil-in-water ("O/W") emulsion which has the oil phase comprising an oil soluble flavor dispersed within the aqueous phase and (B) emulsifying the respective primary emulsions with (1) an external aqueous phase comprising a hydrophilic emulsifier or (2) an external lipid phase comprising a lipophilic emulsifier to produce a multiple emulsion having a soluble flavor encapsulated in the internal phase.

In yet another aspect, the invention involves a method for making a low-fat or no-fat food product which comprises adding between about 1 and about 20 weight percent of a flavor encapsulating multiple emulsion to a low-fat or no-fat food product vehicle.

A variety of methods for making W/O/W emulsions and O/W/O emulsions, are well known. The methods for making W/O/W and O/W/O emulsions are analogous to one another in that in each case a primary emulsifier is present in the intermediate phase, the external phase preferably includes a secondary emulsifier and the internal phase generally lacks emulsifier. Thus, while the following description is directed largely to a 2-step method for making W/O/W multiple emulsions of the invention, it will be understood by those skilled in the art that the described method is analogous to methods for making O/W/O multiple emulsions. Examples 7(a) and 7(b) describe specific methods for making O/W/O multiple emulsions.

The first step of a 2-step method for making a W/O/W multiple emulsion generally involves forming a primary water-in-oil emulsion wherein the internal aqueous phase is homogeneously dispersed in the oil phase. The primary water-in-oil (W/O) emulsion may be formed by slowly adding with continuous mixing under emulsification conditions (e.g., Polytron Model PT 3000 mixer (Kinematica, Switzerland) at 12000 rpm) the internal aqueous solution to an oil phase comprising a lipophilic emulsifier. Mixing is continued until the water phase is stably incorporated into the oil phase forming a homogenous W/O emulsion (e.g., 2 minutes). If an interfacial gel layer is to be formed, the aqueous solution may be supplemented with an aqueous soluble/gellable composition (e.g., sodium alginate) and the oil may be supplemented with a lipophilic surface active agent comprising a gel promoting agent such as a polyvalent metal cation. If an emulsion is desired which additionally, or alternatively, encapsulates a flavor composition, such flavor composition may be included in the internal aqueous solution. It is preferred to carry out the emulsifying step at a temperature of about 20° to about 60° C., more preferably about 40° to 45° C. The resulting water-in-oil emulsions should not separate upon standing; should have low conductivity (about 0 to about microohms); and should not mix when a drop of emulsion is placed in standing water.

In the second step of the two-step procedure for preparing W/O/W multiple emulsions, the primary emulsion is stably incorporated into an external aqueous solution preferably comprising a hydrophilic emulsifier by slowly adding the primary emulsion to the external aqueous phase in a mixer under relatively mild mixing conditions (e.g., 8000 rpm in a Polytron mixer) to yield a W/O/W emulsion. It is especially preferred to then add to the multiple emulsion, subsequent to addition of the solution comprising hydrophilic emulsifier, an edible gum (e.g., 1–4% aqueous solution of xanthan gum, guar gum or the like) in an amount sufficient to make the external aqueous phase about 0.1% to about 2.0% with respect to the gum.

Analogously, a two-step procedure for making O/W/O multiple emulsions involves a first step of mixing an oil lacking lipophilic emulsifier (internal oil phase) with an aqueous solution comprising a hydrophilic emulsifier (intermediate aqueous phase) and, as the second step, mixing the resultant oil-in-water emulsion with an oil preferably comprising lipophilic emulsifier (external oil phase). Oil-in-water emulsions should not separate upon standing; should have high conductivity (greater than about 20 microohms); and should not mix when a drop of emulsion is placed in standing oil.

In several embodiments of the present invention, in which the multiple emulsions comprise an interfacial gel layer, the gel forming combination comprises an aqueous soluble/gellable composition which is dissolved in the internal aqueous phase (W/O/W) or intermediate aqueous phase (O/W/O) and an oil soluble composition comprising a gel promoting agent dissolved in the intermediate oil phase (W/O/W) or the internal oil phase (O/W/O). The gel promoting agent may be dissolved in the oil phase and presented to the aqueous phase in the region of the aqueous/oil interface (i.e., the promoting agent should be capable of bridging the oil/aqueous interface), whereupon gel layer formation may occur predominantly near the aqueous/oil interfacial region.

The aqueous soluble/gellable composition should be present in the aqueous phase at a concentration which is sufficient to support formation of a substantially continuous membrane of gelatinous material at the oil/aqueous interfacial region within about 10 minutes after the primary water-in-oil or oil-in-water emulsion is formed. The concentration of gel promoting agent provided in the oil phase may be used to control the extent of the gel layer so as to promote or prevent the gellation of the entire aqueous phase.

In preferred embodiments of the present invention, a gel forming combination comprises (i) an aqueous soluble/gellable polysaccharide which is rendered gelatinous when complexed with metal cations such as calcium, copper, zinc, iron, potassium, and the like and (ii) as a gel promoting agent, a lipophilic surfactant which comprises such metal cation. As noted above, the interfacial gel layer generally is formed in situ in a localized reaction between the aqueous soluble/gellable polysaccharide present in the aqueous phase and a metal cation provided by a lipophilic surface active agent present in the oil phase. The surface active agent is capable of bridging the aqueous/oil interfacial region of an emulsion and presenting the metal cation to the aqueous phase in the region of the interface.

Aqueous soluble/gellable polysaccharides which form a gel when complexed with metal cations are well known. Among the aqueous soluble/gellable polysaccharides which may be employed in the present invention are sodium salts alginates, iota and kappa carageenans and chitosans.

Alginates are salts of alginic acid, a hydrophilic colloidal polysaccharide obtained from brown algae (seaweed). Alginic acid is a linear polymer of $\beta$-(1→4)-D-mannosyluronic acid and alpha-(1→4)-L-gulosyluronic acid. See, McDowell, R. H. "The Manufacture and Properties of Alginates" CIBA Review, No 1, 3–12 (1969); Haug et al., "A Study of the Constitution of Alginic Acid by Partial Acid Hydrolysis" Acta. Chem. Scand. 20:183-190 (1966).

Carrageenans constitute another type of soluble/gellable polysaccharide. Carragennans are structural polysaccharides of red sea plants such as Chondus crispus and Gigartina stellata consisting of alternating copolymers of $\beta$-(1→3)-D-galactose and (1→4)-3,6- anhydro-D- or L-galactose. There are several varieties of carrageenans which may be extracted from red sea plants for food use, including kappa, lambda and iota carrageenans. Carrageenans are strongly charged anionic polyelectrolytes of high molecular weight and regular configuration which have anionic sulfate ester groups regularly disposed along a polysaccharide backbone. Lambda carrageenan, which has a general linear structure having substantially three pendant sulfate groups for each two monosaccharide groups along the polymer backbone generally does not form gels, while kappa carrageenan and iota carrageenan do. Kappa carrageenan and iota carrageenan have significantly less ester sulfate than lambda carrageenan, with iota carrageenan having approximately one sulfate group per monosaccharide group, and kappa carrageenan having approximately one sulfate group for each two monosaccharide groups along the backbone. A discussion of the physical and chemical properties of carrageenans may be found in Industrial Gums, R. L. Whistler, Ed., Academic Press, N.Y. (1973).

Chitosan is another of the aqueous soluble/gellable polysaccharides. Chitosan (deacylated chitin) is a cellulose-like polymer which consists predominantly of unbranched chains of $\beta$-(1→4)-2-acetamido-2-deoxy-D-glucose. Chitosan may be purchased commercially or readily obtained from crustacean shell as well known in the art (see, e.g., *Chitin and Chitosan: Sources., Chemistry, Biochemistry, Physical Properties and Applications,* Skjak-Braek, Anthonsen and Sandford, Editors, Elsevier Applied Science (1989)).

Gellan gum is yet another type of aqueous soluble/gellable polysaccharide. Gellan gum is a fermentation hydrocolloid (polysaccharide) available commercially from Kelco Inc., San Diego Calif. See also, O'Neill, M. A. et al., Carbohydrate Research 124, 123-133 (1983); Jansson, P. E. et al., Carbohydrate Research, 124, 135-159 (1983).

Most preferred of the aqueous soluble/gellable polysaccharides which may be used in the multiple emulsions of the present invention are sodium alginate (Kelgin LV, Keltone LV or Keltone HV, Kelco, Inc.), gellan gum (Kelco, Inc.,) and iota carrageenan (Viscarin 389, Hercules Inc., Wilmington Del.).

The concentration of polysaccharide in the internal aqueous phase (W/O/W) or the intermediate aqueous phase (O/W/O) may be between 0.1% and 4% more preferably between 1% and 3% by weight based on the weight of the internal aqueous phase or intermediate aqueous phase so as not to be rate limiting.

Lipophilic surface active agents which comprise a metal cation capable of causing gellation of an aqueous soluble/gellable polysaccharide are preferred as the gel promoting agent. Generally, such metal cation is divalent or trivalent, although it may be potassium in the case of kappa carrageenan and gellan gum. Suitable lipophilic surface active agents include $C_6$–$C_{20}$ fatty acids comprising an appropriate metal cation, for example, calcium stearate, calcium palmitate or other calcium, copper, zinc, potassium (kappa carrageenan) or other metal cation salt of a $C_6$–$C_{20}$ fatty acid. Calcium stearoyl-2-lactylate is especially preferred. The concentration of the metal-cation-containing surface active agent should be between 0.2% and 15%, preferably between 2% and 5% by weight in the oil phase.

The relative concentration of the gellable composition and the gel promoting agent to one another may be readily determined by dissolving the selected gel promoting agent in an oil phase and adding dropwise thereto, via a capillary tube, an aqueous solution containing an appropriate concentration of an aqueous soluble/gellable polysaccharide and observing the efficacy of gel formation. Suitable ratios of gel promoting agent to aqueous soluble/gellable compositions useful for producing the multiple emulsions of the present invention allow gel formation to occur within about 60 minutes or less and preferably in less than about 5 minutes.

The rate of polysaccharide gel formation (e.g., complexation with polyvalent metal cations) may be increased by acidifying the polysaccharide containing aqueous solution with vinegar, hydrochloric acid, phosphoric acid, and the like. This facilitates liberation of free metal cations provided by the lipophilic surface active agent, and thus gel formation at the interfacial region.

In making W/O/W multiple emulsions, it is preferred to balance the osmotic pressures in the internal and external aqueous phases of W/O/W multiple emulsions. In this regard, an aqueous solution suitable for the internal aqueous phase may desirably include salt or sugar in an amount to substantially balance the osmotic pressure of the internal aqueous phase to a predetermined osmotic strength of the external aqueous phase. By "substantially isomotic" it is meant that the osmotic pressures in the internal aqueous and external aqueous phases differ by less that about a factor of 2 (i.e., 2-fold), preferably by less than about 25%, and most preferably the osmotic pressures differ by less than 10%. See Example 3.

Also, the internal aqueous phase may desirably comprise a gum such as xanthan gum, gum arabic, carob bean gum, gum tragacanth, guar gum and the like, which generally permits larger internal aqueous compartments to be produced in the W/O/W multiple emulsions. In accordance with several embodiments of the present invention, it may be desirable to acidify this aqueous solution to promote the gel formation process or to include concentrated flavor compositions for encapsulation in the multiple emulsion.

The lipid or oil phase of the W/O/W emulsions of the invention may comprise between about 10% and 30% by weight, preferably from about 15% to about 25% by weight of an edible oil or fat having a melting point not greater than about 37° C., and preferably having a melting point of from about −10° C. to about 25° C. Edible triglyceride oils including hydrogenated oils which are preferred include, for example, soybean oil, olive oil, canola oil, sunflower oil, and other plant derived oils. Oils or fats derived from animal or fish sources may also be used as well as lipid-based fat substitutes such as sucrose polyester and natural wax esters (jojoba oil) and the like. Fractionated oils such as fractionated coconut oil (e.g., C8–C10 fatty acids) may be used because such fractionated oils are particularly resistant to oxidation. Particularly preferred are soybean, olive, canola and sunflower oils. For non-edible emulsions, mineral oils such as paraffin oil and the like may be used.

The lipid phase of a W/O/W emulsion further comprises an "emulsifying-effective" amount of a lipophilic emulsifier. By an "emulsifying-effective" amount is meant about 1% to about 10% by weight, preferably about 1.5% to about 8% by weight, and more preferably, about 3%-8% by weight of a lipophilic emulsifier. Suitable lipophilic emulsifiers may have a HLB of less than about 6 and preferably between about 1 and 3. Preferred lipophilic emulsifiers include sugar esters such as sucrose mono- and di-esters, sorbitol mono- and di-esters, and polyglycerol esters such as polyglycerol oleate esters and polyglycerol ricinoleate esters.

In the several embodiments of the present invention wherein a "stabilizing-effective" amount of ethylcellulose is present in the lipid phase, by the term "stabilizing-effective" amount it is meant an amount of ethylcellulose which is sufficient to increase the oil viscosity and decrease the interfacial tension at the oil/water interface. A concentration of ethylcellulose in the range of about 0.02%-2.0% by weight provides a "stabilizing-effective", amount of ethylcellulose in a W/O/W multiple emulsion. W/O/W multiple emulsions having an oil phase comprising ethylcellulose and a polyglycerol ester emulsifier, especially decaglycerol decaoleate (DGDO), surprisingly exhibit superior stability with respect to coalescence at low temperatures (0° C.-10° C.) as compared to emulsions comprising decaglycerol decaoleate and lacking ethycellulose.

Where the intended use of the multiple emulsions of the present invention is for food emulsions, it may also be desirable to include an antioxidant in the oil phase to prevent so-called "off flavors," characteristic of oxidized triglyceride oils. Suitable lipophilic antioxidants include vitamin E, natural mixed tocopherols, BHA and BHT. In the preparation of emulsions for pharmaceutical applications it is known to use mineral oils which are resistant to oxidation. It may also be desirable to include an aqueous soluble antioxidant such as ethylenediaminetetraacetic acid (EDTA) in aqueous solutions used to prepare the multiple emulsions of the present invention. Antimicrobial agents such as potassium sorbate may be added.

While the aqueous soluble/gellable polysaccharide may be introduced directly into internal aqueous solution, alternatively the polysaccharide may be dispersed in the oil and "extracted" into the internal aqueous phase during primary emulsification step. This is often desirable because the polysaccharide may be relatively easily dispersed in the oil phase, as compared to the time and effort required for hydration directly into an aqueous solution, and the rate of reaction between the gel forming pair (i.e., the polysaccharide and the gel promoting agent) is essentially negligible in the oil phase since the gel formation reaction proceeds substantially only after the polysaccharide is hydrated.

The external aqueous solution used to form the W/O/W emulsions of the present invention may comprise between about 0.5% and about 5% by weight of an appropriate hydrophilic emulsifier. A hydrophilic emulsifier should have a HLB of at least about 10 and preferably between about 14 and 15. It is especially preferred to use a polysorbate emulsifier, such as polyoxyethylene (20) sorbitan mono-stearates and other stearate or oleate esters of sorbitol and its anhydrides copolymerized with varying molar excesses of ethylene oxide. Most preferred of the polysorbate emulsifiers is Tween 60. However, any edible hydrophilic emulsifier capable of being emulsified with a W/O emulsion to form a W/O/W emulsion may be used, including sucrose esters polyglycerol esters, ethoxylated monoglycerides, and proteinaceous emulsifiers.

The external aqueous phase may also include a thickening agent, for example 0.1% to about 5% by weight of an edible gum such as xanthan gum, gellan gum, guar gum, propylene glycol alginate or the like. Such edible gum, preferably xanthan, may be added to the W/O/W emulsion after it has been formed. The gum preferably may be added as a concentrated solution (e.g., 1%-10% aqueous solution) with gentle mixing after addition of the external aqueous solution. See Example 1. Also, osmotic strength of the external aqueous phase may be adjusted (with e.g., NaCl and/or sucrose) so as to approximate that of the internal aqueous phase.

In those embodiments of the present invention which include a gelled polysaccharide layer, an acidic pH may be imparted directly or indirectly to the internal aqueous phase to increase the rate of gel formation. As an alternative to directly acidifying the internal aqueous solution, the internal aqueous solution used in the primary emulsification may have a neutral pH, initially, while the external aqueous solution to which W/O emulsion is added (i.e., in the secondary emulsifying step) is acidified. The acid is able to migrate through the oil phase and into the internal aqueous phase due to the inherent permeability of the oil phase to such molecular species and thereby liberate the metal cations which facilitate the gel forming step.

Preferred for encapsulation of flavor compositions in accordance with the present invention are W/O/W multiple emulsions wherein at least about 70%, preferably at least about 95% of the W/O/W emulsion is characterized in that the internal aqueous phase constitutes a plurality of small droplets (known in the art as type B emulsions). Type B emulsions are formed by using lower mixing speeds (sheer) when forming the primary emulsion.

With respect to producing W/O/W emulsions with multiple droplets in the internal aqueous phase it is preferred to produce primary emulsion with an internal aqueous phase weight fraction, $\phi_{W/O}$, of between about 0.2 and 0.7, preferably about 0.3 to 0.4, where $\phi_{W/O}$ is defined as follows:

$$\phi_{W/O} = \frac{\text{weight percent of internal aqueous phase}}{\text{weight percent of the } W/O \text{ emulsion}}$$

The preferred range of values for the primary emulsion weight fraction, $\phi$ W/O/W, is between about 0.3 and about 0.6, where $\phi$ W/O/W is defined as:

$$\phi_{W/O/W} = \frac{\text{weight percent } W/O \text{ emulsion}}{\text{weight percent of the } W/O/W \text{ emulsion}}$$

Also, relatively higher shear rates during the mixing step for preparing the primary emulsion tends to produce desirably sized, stable, multiple droplets in the internal aqueous phase, especially where the internal aqueous phase comprises about 0.1 to about 1% by weight of an edible gum.

The majority of the individual particles which comprise the W/O/W multiple emulsions of the invention should have a diameter of about 5 microns to about 30 microns, more preferably about 5 to 20 microns and most preferably about 80% or more of the particles should be about 10-15 microns in size. W/O/W emulsions of the present invention having such a particle size distribution exhibit desirable organoleptic characteristics and stability. Emulsions having a particle sizes smaller than about 1 micron in diameter may not contain an encapsulated flavor phase, while emulsions comprising particles larger than about 50 microns may impart a grainy texture to low-fat or no-fat products into which they are incorporated.

The W/O/W emulsions of the present invention are stable at temperatures between about 4° C. and 40° C. making them suitable for use in a wide variety of food products which may be stored at room temperature or refrigerator temperature, especially for preparing low/no fat pourable salad dressings. A low-fat pourable French salad dressing is exemplified in Example 3.

The present invention further entails W/O/W multiple emulsions which encapsulate substantially entirely within the internal aqueous phase one or more concentrated aqueous soluble flavor components, and low-fat and no-fat food products which comprise such flavor encapsulating water-in-oil-in-water multiple emulsions. The flavor encapsulating W/O/W multiple emulsions of the present invention may be incorporated into a variety of no-fat or low-fat food products including dressings, spreads, sauces and desserts. The present invention is also directed to methods of making such flavor encapsulating W/O/W multiple emulsions and to methods of making low fat and no fat food products comprising same. The flavor-encapsulating W/O/W emulsions of the present invention may include, but do not require, a gel layer formed at the internal aqueous/oil interfacial region.

As used herein by "no-fat" with reference to a food product is meant a food product which has less than about 1% fat or oil content by weight, excluding any oil or fat contributed by the lipid phase(s) of the flavor-encapsulating multiple emulsions which may be incorporated therein or less than 0.5 g fat per serving.

As used herein by "low-fat" with reference to a food product is meant a food product vehicle which has less than about 40% fat or oil content by weight, excluding any oil or fat contributed by the lipid phase(s) of the flavor-encapsulating multiple emulsions which are incorporated therein.

A food product "vehicle" as used herein, means a food product lacking at least one aqueous soluble flavor which flavor may be provided by a concentrated-flavor-encapsulating multiple emulsion of the present invention.

In preferred embodiments of the present invention, egg flavors and/or oxidized-oil flavors which are included in the internal and/or intermediate phase(s) of the multiple emulsions at a concentration of about 0.1–15% by weight are incorporated into low- or no-fat viscous or pourable salad dressings. Examples of aqueous soluble egg flavors which are available from commercial manufacturers including Bell Flavors and Fragrances, Northbrook, Ill. (e.g., Natural Egg Flavor #55.10054 and Artificial Egg Flavor #55.6668) and Fritzsche Dodge & Olcott, New York, NY (e.g., Natural Egg Flavor 123025, Natural Egg Flavor 123024 and Egg Flavor WONF 122379). Example 7(c) describes encapsulation of oil-soluble oxidized-oil flavors which may be used in low-fat or no-fat salad dressing. Also, concentrated oil-soluble flavors, e.g. a butter flavor, may desirably be encapsulated in an O/W/O multiple emulsion and incorporated into a low-fat margarine-like spread for improved flavor perception and shelf-life, as described in Example 8.

When incorporated into such reduced fat products, concentrated flavor components encapsulated in W/O/W or O/W/O emulsions retain their flavor for at least several weeks to several months or longer and are readily released exhibiting desirable organoleptic qualities when food product comprising the flavor encapsulating emulsion is eaten. While the flavors are encapsulated in a concentrated form, the substantially instantaneous release of the flavors from the multiple emulsions gives the perception that the flavors are well mixed throughout the product and not present in highly localized pockets of concentration. In particularly preferred embodiments, flavor encapsulating multiple emulsions of the present invention may also comprise a gelled polysaccharide layer at an interal oil/water interface.

The low-fat or no-fat viscous or pourable food products of the present invention may comprise from about 1 to about 20% by weight of flavor encapsulating multiple emulsion more preferably from about 3 to about 6% by weight, based on the total weight of salad dressing. Concentration of a flavor component may be adjusted according to the desired final concentration of flavor-encapsulating emulsion in the low- or no-fat food product.

With respect to low-fat and no-fat viscous and pourable salad dressings the dressing vehicles utilized to prepare salad dressing of the present invention will generally contain an appropriate amount of acidifying agent to provide the aqueous component of the dressing with a pH of less than 4.1, and preferably in the range of from about 2.5 to about 3.7. In accordance with conventional food dressing manufacture, depending on the desired pH, the amount of water in the dressing and the effect of additional components of the food dressing, the acidifying agent, which may include acetic acid or a mixture of acetic and phosphoric acids, will generally be present in an amount of from about 0.1 to about 3.5 weight percent based on the total weight of the dressing vehicle.

Also, in accordance with conventional acid dressing manufacture, the food dressing vehicle may contain up to about 30% by weight of a bodying agent, such as gums, starch, or other hydrocolloids and mixtures thereof, from about 0 to about 5% salt, from about 0 to about 20% sweetener. The food dressing which may be utilized includes low-fat or no-fat pourable or viscous dressings, and emulsified or non-emulsified food dressings commonly used as an adjunct on salads, vegetables, sandwiches and the like. Included within such classification are products such as low-fat "mayonnaise", salad dressing and french dressing and imitations thereof especially low calorie no-fat products.

To the extent that oil is used in a dressing formulation, the oil may be any of the well-known edible triglyceride oils derived from seed oils, for example, corn oil, soybean oil, safflower oil, cottonseed oil, coconut oil and the like including completely or partially hydrogenated or fractionated oils. The sweetener used in such dressing formulations is typically sucrose although other sweeteners such as dextrose, fructose, corn syrup solids and synthetic sweeteners may also be utilized. No-fat dressings may employ fat mimetics as substitutes for the oil which is used in low-fat foodstuffs. Such fat mimetics include but are not limited to insolubilized, microfragmented anisotropic xanthan/protein complex aqueous dispersion as disclosed in PCT International Application No. WO 89/10068, published on Nov. 2, 1989, the contents of which are incorporated herein by reference, and a microparticulated protein product commonly known as Simplesse (Nutrasweet, Deerfield, Ill.). Also, lipid-based fat substitutes may be used including sucrose polyesters, natural wax esters (jojoba oil) and the like.

Most preferred of the fat mimetics is microreticulated microcrystalline cellulose which is disclosed in commonly owned U.S. application Ser. No. 07/395,800, filed Aug. 18, 1989, the contents of which are incorporated herein by reference.

Any suitable emulsifying agent may be used in the low-fat salad dressing compositions of the invention. In this connection, egg yolk solids, protein, gum arabic, carob bean gum, guar gum, gum karaya, gum tragacanth, carrageenan, pectin, propyleneglycol alginate, sodium carboxymethyl-cellulose, polysorbates and mixtures thereof may be used as stabilizing and/or emulsifying agents in accordance with food dressing manufacturing practices. The use of emulsifying agents is optional and depends upon the particular type of emulsified oil being prepared. Emulsifying agents, when used, may typically be present at levels of from about 0.1 to about 10%, depending on the particular emulsifying agent used.

A bodying agent may be used in the food dressing to provide desired body or viscosity in accordance with conventional practice. This bodying agent may be a starch paste or may comprise an edible gum such as xanthan gum, guar gum, propyleneglycol alginate, or the like. Starch, if used, may typically be present at a level of from about 2 to about 10%. The edible gum will typically be present at lower levels to provide desired body and texture.

Starch paste is generally used as a bodying agent in the preparation of semi-solid emulsified oil dressings or the no-fat (i.e., fat substituted) dressings, such as salad dressing, and may be used in the preparation of pourable emulsified oil dressings such as french dressing. The starch may be utilized at a level of from about 1 to about 10% by weight in semi-solid dressings and at a level of from about 0 to about 8% in pourable dressings. Any suitable starch containing material may be used, and in this connection, any food starch, whether modified, unmodified or pregelatinized, tapioca flour, potato flour, wheat flour, oat flour, rye flour, rice flour or mixtures thereof, may be used as a bodying agent in the preparation of food dressings. Similarly, the bodying agent may comprise edible gums individually or in combination and the gums will usually provide the desired body and texture at levels below those normally required when starch paste is used. The gums, when used as a bodying agent, may typically be present at a level of between about 0.5% and 2.5%. Various other ingredients, such as sorbic acid (including salts thereof) may also be included in effective amounts.

Flavor components which are encapsulated in the internal and/or intermediate phase of W/O/W or O/W/O multiple emulsions according to the several embodiments of the present invention including, but not limited to, natural or artificial aqueous soluble dairy flavors, egg flavors and oxidized-oil-flavors may be added to the prepared viscous or pourable food product vehicle as a final step using relatively low-sheer mixing. While virtually any flavor component may be encapsulated in a multiple emulsion of the present invention, it will be understood by the person of ordinary skill that it is especially those flavors which exhibit substantial deterioration in flavor perception (e.g., dairy flavors, etc.) when simply mixed into the low-or no-fat aqueous-based food vehicle which are most advantageously encapsulated. Nevertheless, relatively stable (i.e., in the aqueous-based food vehicle environment) flavors such as vanilla may also be encapsulated rather than being mixed directly into the food vehicle.

While multiple emulsions comprising an interfacial gel layer are, in the preferred embodiments, formed through the interaction of aqueous soluble/gellable polysaccharides present in the aqueous phase and oil soluble calcium containing compounds present in the oil phase, it will be understood that any gel forming pair may be employed to cause interfacial gellation so long as a first compound (capable of forming an edible or non-toxic gel in the presence of a second compound) is soluble in either the aqueous or oil phase and a second compound (capable of initiating or facilitating gel formation in the presence of the first compound) may be delivered to the aqueous/oil interface.

Also, while the methods for making the W/O/W emulsions of the present invention describe the gel promoting agent as being associated with a lipophilic surface active agent, the aqueous soluble/gellable composition (e.g., alginate) alternatively may be conjugated or linked to the hydrophilic portion of a surface active agent by reacting the carboxyl group of a gellable polysaccharide with the charged surface of the lipid so that the polysaccharide is presented to the aqueous phase near the interfacial region while being "anchored" in the oil phase by the lipophilic portion of said surface active agent. Then calcium ions or other suitable metal cations, as the gel promoting agent, may be provided by the aqueous phase simply by adding an appropriate salt such as calcium chloride to promote formation of the interfacial gel layer.

Also, while a 2-step procedure for producing W/O/W emulsions is preferred, a 1-step procedure for making W/O/W emulsion—characterized by a phase inversion during continuous addition of an aqueous solution during emulsification—is well-known in the art. W/O/W multiple emulsions comprising an interfacial gel layer may be produced using such a 1-step method if the aqueous phase contains a concentration of an aqueous soluble/gellable composition similar to that which would be employed in the internal aqueous solution for the 2-step procedure.

The invention will be further described by way of the following examples. The examples are included for illustrative purposes only and should not be construed as limiting the appended claims in any way.

EXAMPLE 1

This Example describes a 2-step process for making W/O/W multiple emulsions comprising a calcium alginate gel layer at the internal aqueous/oil interface. A comparison of the constituents of the four preparations disclosed in Table 1 below demonstrates improved stability of multiple emulsions comprising a calcium alginate gel layer formed in situ where an oil phase which includes a metal-cation-containing surface active agent (e.g., CSL) interfacially contacts an aqueous solution comprising a gellable polysaccharide (sodium alginate), and the improvement derived from adding a gum-containing aqueous solution as a last step in a method for making such W/O/W emulsion.

The method of making the emulsion of preparation no. 1 is described first.

The internal aqueous solution containing aqueous soluble/gellable polysaccharide was prepared by dissolving 1.0 grams Kelgin LV (Kelco, Inc.) in 49.0 grams distilled H$_2$O with gentle stirring.

The oil phase was prepared by solubilizing 2.0 grams of a hexaglycerol mixed ester lipophilic emulsifier, Caprol ET (Capital City Products, Columbus, Ohio), and 1.5 grams of calcium stearoyl-2-lactylate ("CSL") (PatCo, Kansas City, Mo.) in 46.5 grams of soybean oil to give an oil phase which was 4.0% CAPROL ET and 3.0% CSL. Solubilization of the lipophilic composition was carried out at 40° C. with mixing.

50 grams of the oil phase was heated to 40° C., added to a Polytron mixer and stirred at 12000 rpm; 50 grams of the internal aqueous was slowly added with constant mixing. Mixing was continued for 2 minutes to produce a W/O emulsion.

30 grams of an external aqueous phase comprising 12 grams of vinegar (120 grain), 6 grams of sucrose, 2.5 grams of NaCl, 0.36 grams of Tween 20, and 9.14 grams of water was added to a Polytron mixer, mixed at 8000 rpm, and 50 grams of the W/O emulsion was added thereto; the mixing was carried out for 1 minute, followed by the addition of 20 grams of a 1% xanthan solution (a separately added part of the external aqueous phase) with mixing at 6000 rpm for 1 minute.

Preparation Nos. 2–4 were prepared the same as above except: in preparation no. 2 the two components of the external aqueous solution were premixed and added to the W/O emulsion with mixing at 8,000 rpm for 1 minute; in preparation no. 3 Caprol ET was omitted; and in Preparation No. 4 CSL was omitted.

In each of the four W/O/W preparations in the following Table, the $\phi_{W/O}$ and $\phi_{W/O/W}$ were each 0.5.

Preparation nos. 1 and 2, which contained both sodium alginate and calcium stearoyl-2-lactylate produced emulsions which remained stable for greater than 15 days. The W/O/W emulsion of preparation No. 1, wherein 1% xanthan is added as the last step, provided the best multiple emulsion. Preparation no. 3 (lipophilic emulsifier omitted) did not form a multiple emulsion. The multiple emulsion formed in preparation no. 4 coalesced within one day.

TABLE 1

| Prep. No. | Preparation of W/O Emulsion | | Preparation of W/O/W Emulsion | | Observations |
|---|---|---|---|---|---|
| | Oil Phase | Internal Aqueous Phase | W/O Emulsion | External Aqueous Phase | |
| 1 | 2.0 g Caprol ET + 1.5 g CSL 46.5 g Soybean oil | 50 g Kelgin LV (2% solution) | 50 g | 30 g external aqueous phase* added first; 20 g of 1% xanthan is then added to W/O/W emulsion | Nice multiple emulsion. Stable for >15 days. |
| 2 | 2.0 g Caprol ET + 1.5 g CSL 46.5 g Soybean oil | Same as #1 | 50 g | Same as #1 but the external aqueous phase is mixed with xanthan solution and W/O emulsion is poured into this combined aqueous soln. | Significantly less multiple emulsion drops |
| 3 | 1.5 g CSL 48.5 g Soybean oil | Same as #1 | 50 g | Same as #1 | No multiple emulsions |
| 4 | 2.0 g Caprol ET 48 g Soybean oil | Same as #1 | 50 g | Same as #1 | Initially, some multiple drops seen but after a day no multiple drops |

EXAMPLE 2

This example shows the effect that the weight fractions, "$\phi W/O$" and "$\phi W/O/W$," on the formation of W/O/W multiple emulsions.

W/O/W emulsions were prepared by the method described in Example 1. Preparation Nos. 1, 2, 3 and 4 had $\phi W/O$ and $\phi W/O/W$ weight fractions of (0.67, 0.67), (0.57, 0.50), (0.47, 0.40) and (0.37, 0.33), respectively. In all cases, 50 grams of W/O primary emulsions were prepared. The primary emulsions were then dispersed with appropriate external aqueous phase to give W/O/W emulsion containing about 20% fat. The oil phase contained 4.65 weight percent Caprol 10G100 (Capital City Products, Columbus, Ohio) as a primary emulsifier. The internal aqueous phase contained NaCl, sucrose and vinegar in addition to Keltone HV (sodium alginate). All four multiple emulsions appropriately contained the same amounts of all the ingredients.

Preparation No. 4 and preparation No. 4A, in which sodium alginate was dispersed in the oil phase rather than being hydrated directly in the aqueous phase, yielded very good multiple emulsions. Sodium alginate was omitted from sample 4B.

Good to excellent W/O/W emulsions were formed where the $\phi W/O$ was about 0.37–0.47 and multiple emulsions with many multiple drops were obtainable by starting with W/O emulsion of lower internal aqueous phase volume fraction (higher oil content).

TABLE 2

| Ingredients | PREPARATION NO. | | | | | |
|---|---|---|---|---|---|---|
| | 1 | 2 | 3 | 4 | 4A | 4B |
| OIL PHASE | | | | | | |

TABLE 2-continued

| Ingredients | PREPARATION NO. | | | | | |
|---|---|---|---|---|---|---|
| | 1 | 2 | 3 | 4 | 4A | 4B |
| Soybean oil | 15.0 g | 20.0 g | 25.0 g | 30.0 g | 30.0 g | 30.0 g |
| Caprol 10G100 | 0.75 g | 1.0 g | 1.25 g | 1.5 g | 1.5 g | 1.5 g |
| CSL | 0.375 g | 0.5 g | 0.625 g | 0.75 g | 0.75 g | 0.75 g |
| Na Alginate (Keltone MV) (dry weight) | 0.0 | 0.0 g | 0.0 | 0.0 | 0.28 g | 0.0 g |
| INTERNAL AQUEOUS PHASE (IAP) COMPOSITION | | | | | | |
| 4% Na Alginate (Keltone MV) | 5.25 g | 7.0 g | 8.75 g | 10.5 g | 0.0 g | 0.0 g |
| Sucrose | 2.25 g | 3.0 g | 3.75 g | 4.5 g | 4.5 g | 4.5 g |
| NaCl | 0.75 g | 1.0 g | 1.25 g | 1.5 g | 1.5 g | 1.5 g |
| Vinegar (12%) | 1.13 g | 1.5 g | 1.08 g | 2.25 g | 2.25 g | 2.25 g |
| Water | 24.5 g | 16.0 g | 7.5 g | 0.0 g | 10.22 g | 10.22 g |
| Total Weight of IAP | 33.88 g | 28.5 g | 23.13 | 18.75 g | 18.47 g | 18.47 g |
| EXTERNAL AQUEOUS PHASE (EAP) COMPOSITION | | | | | | |
| Sucrose | 2.25 g | 3.0 g | 3.75 g | 4.5 g | 4.5 g | 4.5 g |
| NaCl | 0.75 g | 1.0 g | 1.25 g | 1.5 g | 1.5 g | 1.5 g |
| Vinegar (12%) | 0.75 g | 1.0 g | 1.25 g | 1.5 g | 1.5 g | 1.5 g |
| Tween 60 | 0.15 g | 0.2 g | 0.25 g | 0.3 g | 0.3 g | 0.3 g |
| Water | 6.1 g | 24.8 g | 43.5 g | 61.2 g | 61.2 g | 61.2 g |
| Total Weight of EAP | 10.0 g | 30.0 g | 50.0 g | 69.0 g | 69.0 g | 69.0 g |
| 1% Xanthan | 15.0 g | 20.0 g | 25.0 g | 30.0 g | 30.0 g | 30.0 g |
| $\phi$W/O | 0.67 | 0.57 | 0.47 | 0.38 | 0.37 | 0.37 |
| $\phi$W/O/W | 0.67 | 0.50 | 0.40 | 0.33 | 0.33 | 0.33 |
| pH | 3.97 | 3.93 | 3.93 | 3.88 | 3.9 | 3.9 |
| OBSERVATIONS | Very Few Multiple Drops | Few Multiple Drops | Good Multiple Emulsion | Excellent Multiple Emulsion | Very Good Multiple Emulsion | Few Multiple Emulsion |
| Moisture | 69.00% | 69.10% | 69.07% | 69.52% | | |
| Fat | 21.97% | 22.22% | 21.52% | 21.52% | | |
| Salt | 2.08% | 2.02% | 2.01% | 2.04% | | |

EXAMPLE 3

This example discloses a low-fat French dressing made from W/O/W multiple emulsions of the present invention which comprise a calcium alginate gelatinous membrane at the internal aqueous/oil interfacial region. Improved low-fat French dressing compositions were achieved where the internal aqueous phase was acidified and the salt and sugar content of the French-type dressing multiple emulsion was divided between the two aqueous phases of the emulsion so as to approximate a balance in osmotic pressures.

The W/O/W multiple emulsions were prepared as described in Example 1 (prep. no. 1) except for the various differences in the internal aqueous and oil phases. In this Example, the oil phase contained ethylcellulose. The ethylcellulose should be dissolved in the oil before the other ingredients. The oil was heated to 200° C. to solubilize the ethylcellulose and then cooled to 40° C. at which temperature CSL, Keltone and Caprol ET were added in the amounts indicated below.

The pH of the French dressing W/O/W emulsions was 3.9. The net oil content in these formulations is 18%. The French dressings nos. 1 and 2 exhibited taste perception and mouthfeel which were comparable to their full-fat counterparts. French dressing no. 1 remained stable for about three (3) months; French dressing no. 2 (smaller difference in osmotic pressures between internal and external phases) remained stable for at least four (4) months. The control emulsions, in which CSL and sodium alginate were omitted, coalesced in about one day.

TABLE 3

| W/O/W EMULSION FRENCH DRESSINGS | |
|---|---|
| Preparation No. 1 | Preparation No. 2 |
| Oil Phase | |
| 1 g Caprol ET | SAME |
| 0.5 g CSL (Calcium stearyl lactylate) | AS NO. 1 |
| 20 g SBO | |
| 0.05 g Ethocel | |
| Internal Aqueous Phase | |
| 28.5 g 1% Keltone HV | 28.5 g 1% Keltone HV |
| 0.0 g Sugar | 5.0 g Sugar |
| 0.0 g Salt | 1.0 g Salt |
| 0.0 g Vinegar | 1.5 g Vinegar |
| External Aqueous Phase | |
| 10 g Sugar | 5 g Sugar |
| 2.0 g Salt | 1 g Salt |
| 0.9 g Mustard Flour | 0.9 g Mustard Flour |
| 0.005 g oleoresin black pepper | 0.005 g oleoresin black pepper |
| 0.005 g oleoresin garlic | 0.005 g oleoresin garlic |
| 3.0 g Vinegar | 1.5 g Vinegar |
| 0.8 g Paprika | 0.8 g Paprika |
| 23.1 g Water | 23.1 Water |
| 0.2 g Tween 20 | 0.2 g Tween 20 |
| 10 g 1% Xanthan solution | 10 g 1% Xanthan solution |

EXAMPLE 4(a)

Examples 4(a)–(e) show encapsulation of concentrated egg flavors in the internal aqueous phase of W/O/W multiple emulsions, which emulsions were in turn incorporated into an essentially no-fat aqueous-based salad dressing vehicle.

TABLE 4

| Ingredient | Source | Amount (grams) |
|---|---|---|
| Soybean Oil | KGF Food Ingredients Group Memphis, TN | 19.96 g. |
| Ethylcellulose | Ethocel, Premium Standard 100, Dow Chemical Co., Midland, MI | 0.04 g |
| Caprol 10G100 | Capital City Products Columbus, OH | 1.4 g |
| Sucrose | | 4.0 g |
| NaCl | | 1.0 g. |
| Egg flavor F & C #094823 | Fries & Cino, New York, NY | 11.4 g. |
| Water | | 29.5 g. |
| 120 grain vinegar | | 2.0 g. |
| Tween 60 | ICI Americas, Inc. Wilmington, DE | 0.3 g. |
| Water | | 65.0 g. |
| 1% Xanthan | Kelco, Inc. San Diego, CA | 15.0 g. |

0.04 grams of ethylcellulose was dissolved in 9.96 grams of soybean oil (at 200° C.) with stirring. The oil was cooled to 40° C. and 1.4 grams Caprol ET was added with continued stirring.

Separately, the internal aqueous solution was prepared by dissolving 4.0 grams of sugar, 1.0 grams of sodium chloride and 11.4 grams of F&C#094823 aqueous soluble egg flavor (paste) in 65 grams of water, followed by the addition of 2 grams of vinegar.

Immediately after the internal aqueous phase was prepared it was slowly added to the oil phase with stirring in the Polytron mixer at 12000 rpm for 2 minutes to form a homogeneous water-in-oil emulsion.

Separately, 0.3 grams of Tween 60 was dissolved in 65 grams of water at 40° C. with stirring in a Polytron mixer. With the Tween 60-containing aqueous solution stirring at 8,000 rpm, the W/O emulsion was slowly added and mixing was carried out for 1 minute. Then the mixing speed was reduced to 6,000 rpm and 15.0 grams of 1% xanthan was added and mixing was carried out for an additional 1 minute.

The resulting W/O/W emulsion, which comprises concentrated egg flavor encapsulated within the internal aqueous phase of the multiple emulsion, was very stable at 4° C. and at 25° C. for at least 2 days. Omitting ethylcellulose resulted in multiple emulsions which coalesced within a few hours at 4° C. and 25° C.

EXAMPLE 4(b)

A flavor-encapsulating W/O/W multiple emulsion was prepared as in Example 4(a), except that polyglycerol polyricinoleate (SY-Glyster CR-500, Sakamoto Chemicals, Osaka, Japan) was used as the lipophilic emulsifier and decaglycerol decaoleate and ethylcellulose were omitted. The multiple emulsion was very stable at 4° C. and at 25° C.

EXAMPLE 4 (c)

A flavor-encapsulating W/O/W multiple emulsion was prepared as in Example 4(a), except that the soybean oil was supplemented with 0.5 grams calcium stearoyl-2-lactylate (CSL) and 0.4 grams Keltone LV (sodium alginate) in addition to the Caprol ET and ethylcellulose. The resulting W/O/W multiple emulsion comprised a calcium alginate film which was formed in situ at the internal aqueous/oil interfacial region. This flavor-encapsulating multiple emulsion was stable at 4° C. and 25° C. for at least four (4) months.

EXAMPLE 4(d)

A flavor-encapsulating W/O/W multiple emulsion was prepared as in Example 4(c), except that ethylcellulose was omitted from the oil. The ethylcellulose-minus multiple emulsion was stable at 25° C. for at least four (4) months and at 4° C. for about one (1) week.

EXAMPLE 4(e)

A flavor-encapsulating W/O/W multiple emulsion was prepared as in Example 4(c), except that the amount of aqueous soluble egg flavor (F&C#094823) was reduced by one half (to 5.7 grams) and 1.42 grams of oil soluble egg flavor (Edlong #5-15-29-89B, Edlong, Inc., Elk Grove : Village, Ill.) was dissolved in the oil phase such that concentrated egg flavors were present in both the internal aqueous phase and the oil phase of the resultant W/O/W multiple emulsion. This multiple emulsion was very stable at 4° C. and at 25° C. for at least four (4) months.

EXAMPLE 5(a)

This example describes a method of making a low-fat viscous salad dressing vehicle. One or more aqueous soluble or oil soluble flavors are omitted from the salad dressing vehicle. These flavors are provided in concentrated form, encapsulated in a multiple emulsion which is added as the final step in preparation of a viscous salad dressing. Preparation of salad dressing vehicle entails preparation of a "premix" component and a starch-containing base component and mixing of these two components at a ratio of 55:45 to provide very low fat, substantially no-fat salad dressing vehicle comprising microreticulated microcrystalline cellulose as a fat mimetic.

| Unflavored Premix | |
|---|---|
| Water | 34.3% |
| Microreticulated Microcrystalline cellulose, (9.07%) | 44.1% |
| Vinegar (120 grain) | 0.4% |
| Soybean Oil | 1.8% |
| Salt | 3.6% |
| Granulated Sugar | 6.6% |
| Egg Whites (Fine Grade) | 0.1% |
| Xanthan (Fine Grade) | 1.7% |
| Iota Carrageenan (Viscarin 389) | 0.2% |
| Propylene Glycol Alginate (Kelco 480K) | 0.1% |
| Starch (Frodex 24) (Amaizo) | 6.6% |
| Titanium Dioxide | 0.5% |
| | 100% |
| Starch Base | |
| Water | 77.4% |
| Starch (Frodex 24) | 6.7% |
| Vinegar (120 Grain) | 4.9% |
| Tapioca (Purity 69A) | 10.0% |
| Lactic Acid (50%) | 1.0% |

To prepare the premix, the egg whites, propylene glycol alginate, iota carageenan and xanthan are slurried in soybean oil in a Hobart mixer at 600 rpm for two minutes. Separately, the microreticulated microcrystalline cellulose, prepared as described in U.S. Pat. No.

5,011,701 A 9.07% microreticulated microcrystalline cellulose suspension is prepared by combining appropriate amounts of microreticulated microcrystalline cellulose and deionized water.

Also separately, the titanium dioxide is slurried in a small amount of water. The remainder of the water is added to the microreticulated microcrystalline cellulose and mixed at 300 rpm until well mixed. Then the titanium dioxide slurry is added and mixing is carried out for 2 minutes at 300 rpm. To the mixing microcyrystalline cellulose slurry, is added the oil slurry containing the egg whites, propylene glycol alginate, iota carageenan and xanthan, and mixing is continued for an additional 3 minutes at 300 rpm. Then, the sugar and Frodex 24 are added at 150 rpm and mixed at 300 rpm for 30 seconds, followed by addition of salt and vinegar which are added at 150 rpm, blended at 300 rpm and mixed at 600 rpm for one minute. Lastly, the premix is passed through a Manton-Gaulin colloid (Manton-Gaulin Manufacturing Co. Inc., Everett, Ma.) mill at two turns open and the pump set at 7½.

The starch base is prepared in a Groen steam jacketed cooking kettle. Water is added to the kettle and the Frodex and tapioca, starch, vinegar and lactic acid are mixed in until blended. The mixture is steam heated until it reaches 180° F. The steam is then cut off, and the mixture continues to heat to 175° F. for about 30–60 seconds to complete its cooking cycle. Chilled water is then circulated through the kettles circulation jacket to cool the starch base mixture to about 110° F.

The premix and starch base are blended at a 55:45 ratio in a Hobart mixer at 600 rpm for about 2 minutes until the salad dressing vehicle is well mixed.

EXAMPLE 5(b)

This example describes a method of making a no-fat viscous salad dressing vehicle. An essentially no-fat salad dressing vehicle was made as described in Example 5(a) except that instead of slurrying the gums in oil, the gums were mixed with the salt, sugar and Frodex in a Hobart mixer at 600 rpm and added to the microcrystalline cellulose slurry. The resulting salad dressing vehicle is substantially free from oil; the flavor-encapsulating multiple emulsions which are added to the salad dressing constitute the total oil content of the dressings.

EXAMPLE 6

3.8 weight percent of flavor-encapsulating water-in-oil-in-water emulsion of Example 4(a)–(e), based on the total weight of salad dressing were blended into the salad dressing vehicle prepared in Example 5 (a) and (b) in the Hobart mixer at 150 rpm for 1 minute. Each of the resulting salad dressings, which comprised a flavor-encapsulating W/O/W emulsion, exhibited excellent organoleptic character. Flavor perception was determined in taste tests which were conducted weekly for the first month and monthly for the following 3 months, using 6 panelists. The dressings comprising the flavor-encapsulating emulsions of Examples 4(b)–(e) were flavor-stable for at least 2 months, but showed some deterioration of flavor by the third month when compared to freshly prepared dressing (positive control). The flavor of the salad dressing comprising the emulsion of Example 4(a) and salad dressing in which the egg flavor was simply mixed into the salad dressing vehicle (negative control; non-encapsulated flavor) each exhibited a marked and substantial deterioration of flavor perception within the first two weeks after preparation. In each case, the salad dressings were stored at 25° C.

EXAMPLE 7(a)

This example describes a 2-step process for preparing stable, butter-flavor-encapsulating O/W/O multiple emulsions comprising calcium alginate gel layer at the internal oil/aqueous interface.

1.0 gram of calcium stearoyl-2-lactylate (CSL), 4.5 grams of oil soluble butter flavor and 0.5 grams Keltone HV (sodium alginate, high viscosity) were added with mixing to 34.0 grams of soybean oil (40° C.).

To 40 grams of the aqueous phase (1.5 grams of vinegar (120 grain), 1.5 grams of Tween 60, 37.0 grams of water) mixing at 15000 rpm in a Polytron mixer was added 40 grams of the internal oil phase. Mixing was carried out for 2 minutes to produce an O/W emulsion. Then to 51.5 grams of the external oil phase (50.0 grams soybean oil and 1.5 grams Span 80) stirring in a Polytron mixer at 7000 rpm, is added 30 grams of the O/W emulsion. Mixing is continued for 1 minute to produce an O/W/O emulsion.

This butter-flavor-encapsulating O/W/O multiple emulsion is used as described in Example 8 below to flavor a low-fat margarine-like spread.

| Composition of O/W/O Emulsions | |
|---|---|
| Internal Oil Phase | |
| 34 g Soybean oil | 34.0 g. |
| 1.0 g CSL | 1.0 g. |
| 4.5 g Butter Flavor #5129-24-1 KGF Flavor Group, (Glenview, IL) | 4.5 g. |
| 0.5 g Keltone HV | 0.5 g. |
| Aqueous Phase | |
| 1.5 g Tween 60 | 1.5 g. |
| 1.5 g Vinegar (120 grain) | 1.5 g. |
| 37.0 g Water | 37.0 g. |
| External Oil Phase | |
| 50.0 g Soybean oil | 50.0 g. |
| 1.5 g Span 80 | 1.5 g. |

EXAMPLE 7(b)

This example describes a 2-step process for preparing butter-flavor-encapsulating O/W/O multiple emulsions, which do not include a calcium signals layer.

The oil, oil-soluble flavor and xanthan are mixed together at 20,000 rpm in a Polytron mixer. 40 grams of the aqueous phase (1% Tween 60)is added and mixing is carried out for 2 minutes to produce O/W emulsion. Then to 102 grams of the external oil phase stirring in a Polytron mixer at 15,000 rpm, is added the entire amount of the O/W emulsion. Mixing is continued for 1 minute to produce a flavor-encapsulating O/W/O emulsion.

| Composition of O/W/O Emulsions | |
|---|---|
| Internal Oil Phase | |
| Soybean oil | 40.0 g. |
| Butter Flavor #BK3 (KGF Flavor Group, (Glenview, IL) | 4.0 g. |
| Xanthan gum | 0.1 g. |
| Aqueous Phase | |
| 1% Tween 60 | 40.0 g. |
| External Oil Phase | |
| Soybean oil | 100.0 g. |
| Myverol 1892 (Eastman Chemical Products | 2.0 |

-continued

| Composition of O/W/O Emulsions |
|---|
| Kingsport, TN) |

EXAMPLE 7 (c)

This example describes a 2-step process for preparing O/W/O multiple emulsions which encapsulate an oxidized oil flavor.

The flavor-encapsulating O/W/O of this example is prepared as described in Example 7(b) above except that 4.0 grams of Oxidized-oil flavor #172072 (Fries & Fries, Cincinnati, Ohio) was used. The O/W/O multiple emulsions were added to the no-fat salad dressing vehicle described in Example 5(b). A panel of 6 taste testers determined that the resulting salad dressings had a substantially improved taste and mouthfeel as compared to the control salad dressing in which the oxidized oil flavor was mixed directly with the pre-mix and starch base.

EXAMPLE 8

This example describes a method of making a low-fat margarine-like spread vehicle which comprises a butter-flavor-encapsulating O/W/O multiple emulsion of Example 7(a)–(b).

Preparation of the margarine-like spread entails mixing (1) a xanthan gum mix, (2) a water/salt mix, and (3) an oil blend in a continuous feed system to form an emulsion, and chilling the emulsion to partially crystallize the oil phase. The flavor encapsulating O/W/O emulsion is added after the emulsification step and prior to the chilling step.

| Xanthan Gum Mix | |
|---|---|
| Water (120° F.) | 99.5% |
| Xanthan Gum | 0.5% |
| Water/Salt Mix | |
| Water (60° C.) | 84.45% |
| Salt | 14.05% |
| Potassium Sorbate | 0.47% |
| EDTA | 0.03% |
| Oil Blend | |
| Partially hydrogenated soybean oil | 96.8% |
| Myverol 1892 | 2.5% |
| Lecithin | 0.7% |
| Low-Fat Spread Vehicle | |
| Xanthan Gum Mix | 51.0% |
| Water/Salt Mix | 21.0% |
| Oil Blend | 28.0% |

The xanthan gum mixture is prepared in a Polytron mixer (12,000 rpm, 2 minutes); the water/salt mix and oil blend are each prepared in a Hobart mixer (600 rpm, 2 minutes).

At a feed-rate ratio of 5:2:3 of xanthan gum mix:water/salt mix:oil blend these three components are continuously fed into a Pantex mixer and blended at 2000 rpm (peak shear = 8000 sec$^{-1}$) to form a water-in-oil emulsion. The xanthan gum mix, water/salt mix and oil blend are maintained at a temperature of 120° F., 60° F. and 120° F., respectively and the temperature of the emulsion after emulsification in the Pantex is about 105° F. The heated emulsion is then fed from the Pantex mixer to a liquid ammonia cooled, APV Crepaco Scraped Surface Heat Exchanger (SSHE) for partial crystallization of the margarine-like emulsion. A butter flavor encapsulating O/W/O multiple emulsion prepared as described in Example 7(a) or 7(b) is combined with the margarine emulsion (at a ratio of feed-rates of 1 part O/W/O: 9 parts margarine vehicle) as it is fed from the Pantex mixer to the Scraped Surface Heat Exchanger. The mixture of the margarine-like emulsion and the flavor-encapsulating O/W/O multiple emulsion then enters the SSHE where it is cooled to 50° F, at a rate of 300° F/minute, with surface scraping at 340 rpm. The margarine-like emulsion is in residence in the SSHE for about 11 seconds.

Alternatively, the butter flavor-containing O/W primary emulsion which is produced in the first step of the 2-step procedure described in Example 7(a) or (b) is dispersed directly into the low-fat spread vehicle during blending in the Pantex mixer where in situ formation of O/W/O emulsions will occur.

While the invention has been described with some specificity, modifications apparent to those with ordinary skill in the art may be made without departing from the spirit of the invention.

Various features of the invention are set forth in the following claims.

What is claimed is:

1. A stable, edible water-in-oil-in-water emulsion comprising an internal aqueous phase, an intermediate lipid phase which includes a lipophilic emulsifier, and an external aqueous phase, the internal aqueous phase being dispersed in the external aqueous phase, said multiple emulsion further comprising a substantially continuous gelled layer at an interfacial region between the internal aqueous phase and the lipid phase, said substantially continuous gelled layer being formed by the reaction of a gellable polysaccharide which is soluble in said internal aqueous phase and a lipophilic surface active agent which comprises a metal cation present in said intermediate lipid phase which is reactive with said polysaccharide to form said gelled layer to provide an edible multiple emulsion for use in a food product.

2. A W/O/W multiple emulsion according to claim 1, wherein at least a portion of the internal aqueous phase is liquid.

3. A W/O/W multiple emulsion according to claim 2 wherein said internal aqueous phase comprises a hydrophilic emulsifier.

4. A W/O/W multiple emulsion according to claim 3, wherein said gelled layer comprises an aqueous soluble/gellable polysaccharide.

5. A W/O/W multiple emulsion according to claim 4 wherein said polysaccharide is selected from the group consisting of alginates, carrageenans, chitosans and gellan gums.

6. A W/O/W multiple emulsion according to claim 3 wherein said gelled layer comprises a calcium salt of said polysaccharide.

7. A W/O/W multiple emulsion according to claim 4 wherein said lipophilic emulsifier is a polyglycerol ester.

8. A W/O/W multiple emulsion according to claim 7 wherein the oil phase comprises ethylcellulose.

9. A W/O/W multiple emulsion according to claim 8 wherein said lipophilic emulsifier is decaglycerol decaoleate.

10. A W/O/W multiple emulsion according to claim 9 wherein said internal aqueous phase has a pH less than about 6.

11. A method for making an edible W/O/W multiple emulsion for use in a food product having a substantially continuous gelatinous layer being disposed at an interfacial region between the internal aqueous phase and a lipid phase of the multiple emulsion, the method comprising the steps of:

forming a water-in-oil emulsion having (i) an aqueous phase which includes a concentration of an aqueous soluble/gellable polysaccharide effective to form a substantially continuous gelatinous layer at the aqueous/oil interface of the water-in-oil emulsion and (ii) a lipid phase which includes an amount of lipophilic emulsifier which is effective to form a water-in-oil emulsion and a metal cation-containing lipophilic surface active agent in an amount sufficient to present an effective concentration of said metal cation to said aqueous oil interface to form said substantially continuous gelatinous layer; and emulsifying said water-in-oil emulsion with an external aqueous phase to form said W/O/w multiple emulsion.

12. A method according to claim 11 wherein said external aqueous phase comprises a hydrophilic emulsifier.

13. A method according to claim 12, wherein the polysaccharide is selected from the group consisting of alginate, carrageenan, chitosan and gellan gum.

14. A method according to claim 13, wherein said lipophilic surface active agent is the metal cation salt of a fatty acid.

15. A method according to claim 14, wherein said metal cation is calcium.

16. A method according to claim 15, wherein said gelatinous layer comprises calcium alginate.

17. A method according to claim 16 wherein the internal aqueous phase and the external aqueous phase are substantially isoosmotic.

18. A method according to claim 11 wherein the lipid phase has dispersed therein said polysaccharide and said polysaccharide is extracted into the aqueous phase by the emulsifying step for forming said water-in-oil emulsion.

19. A method according to claim 13, wherein the lipophilic emulsifier is a polyglycerol oleate ester.

20. A method according to claim 19, wherein the lipid phase further comprises ethylcellulose.

21. A method according to claim 20, wherein at least one of the aqueous phases has an acidic pH.

22. An edible flavor encapsulating water-in-oil-in-water (W/O/W) multiple emulsion for use in a food product comprising (i) an internal aqueous phase comprising at least one concentrated aqueous soluble flavor, the concentration of said flavor being from about 10-fold to about 350-fold as compared to the concentration of said flavor in a food vehicle base when said flavor is added with other ingredients, (ii) a lipid phase comprising an edible lipid and a lipophilic emulsifier (iii) an external aqueous phase comprising a hydrophilic emulsifier, said internal aqueous phase being dispersed within said limped phase and said lipid phase being dispersed within said external aqueous phase, said multiple emulsion further comprising substantially continuous gelled layer at an interfacial region between the internal aqueous phase and the lipid phase, said substantially continuous gelled layer being formed by the reaction of a gellable polysaccharide which is soluble in said internal aqueous phase and a lipophilic surface active agent which comprises a metal cation present in said intermediate lipid phase which is reactive with said polysaccharide to form said gelled layer to provide an edible multiple emulsion for use in a food product.

23. An edible flavor-encapsulating W/O/W multiple emulsion according to claim 22 wherein said lipophilic emulsifier is a polyglycerol ester.

24. An edible flavor-encapsulating W/O/W multiple emulsions according to claim 23 wherein the oil phase further comprises between about 0.02 and about 2.0 weight percent ethylcellulose based on the weight of the oil phase.

25. An edible flavor encapsulating W/O/W multiple emulsion according to claim 24 wherein said lipophilic emulsifier is decaglycerol decaoleate.

26. An edible flavor-encapsulating W/O/W multiple emulsion according to claim 25 wherein said lipid phase further comprises an antioxidant.

27. An edible flavor-encapsulating W/O/W multiple emulsion according to claim 23 wherein said multiple emulsion having a particle size of from about 2 microns to about 30 microns.

28. An edible flavor-encapsulating W/O/W multiple emulsion according to claim 27, wherein at least about 80% of said W/O/W emulsion particles have a particle size of between about 5 and about 20 microns.

29. A stable, edible water-in-oil-in-water multiple emulsion for use as a food product comprising an internal aqueous phase which is dispersed in an intermediate lipid phase which includes an emulsifying-effective amount of a lipophilic emulsifier and an emulsion-stabilizing-effective amount of ethylcellulose, wherein the intermediate lipid phase is dispersed in an external aqueous phase which includes a hydrophilic emulsifier, said multiple emulsion further comprising a substantially continuous gelled layer at an interfacial region between the internal aqueous phase and the lipid phase, said substantially continuous gelled layer being formed by the reaction of a gellable polysaccharide which is soluble in said internal aqueous phase and a lipophilic surface active agent which comprises a metal cation present in said intermediate lipid phase which is reactive with said polysaccharide to form said gelled layer to provide an edible multiple emulsion for use in a food product.

30. A stable W/O/W multiple emulsion according to claim 29 wherein said lipophilic emulsifier is a polyglycerol oleate ester.

31. A W/O/W multiple emulsion according to claim 30 wherein the intermediate lipid phase comprises between about 0.02 and about 2.0 weight percent ethylcellulose based on the total weight of said lipid phase.

32. A stable W/O/W multiple emulsion according to claim 31 wherein the lipophilic emulsifier comprises decaglycerol decaoleate.

33. An edible oil-in-water-in-oil multiple emulsion for use in a food product having an internal oil phase which is dispersed in an intermediate aqueous phase which includes a hydrophilic emulsifier, which aqueous phase is dispersed in an external oil phase which includes a lipophilic emulsifier, said multiple emulsion further comprising a substantially continuous gelled layer at an interfacial region between the intermediate internal aqueous phase and the internal oil phase, said substantially continuous gelled layer being formed by the reaction of a gellable polysaccharide which is soluble in said intermediate aqueous phase and a lipophilic surface active agent which comprises a metal cation present in said internal oil phase which is reactive with said polysaccharide to form said gelled layer to provide an edible multiple emulsion for use in a food product.

34. An O/W/O multiple emulsion according to claim 33 wherein the gelatinous layer comprises a gelled aqueous soluble/gellable polysaccharide.

35. An O/W/O multiple emulsion according to claim 34 wherein said polysaccharide layer comprises calcium alginate.

36. An O/W/O multiple emulsion according to claim 33 wherein the internal oil phase comprises an oil soluble flavor composition.

37. A W/O/W multiple emulsion according to claim 4, wherein the internal aqueous phase comprises an aqueous soluble/gellable polysaccharide and the internal aqueous phase is entirely gelled.

38. An edible flavor-encapsulating W/O/W multiple emulsion according to claim 23, said multiple emulsion further comprising a substantially continuous gelatinous layer at an interfacial region between the internal aqueous phase and the lipid phase.

39. An edible flavor-encapsulating W/O/W multiple emulsion according to claim 38, wherein the oil phase further comprises between about 0.02 and about 2.0 weight percent ethylcellulose based on the weight of the oil phase.

40. An edible flavor-encapsulating W/O/W multiple emulsion according to claim 34, wherein said lipophilic emulsifier is decaglycerol decaoleate.

41. A low-fat or no-fat viscous or pourable food product comprising from about 80 to about 99 weight percent low-fat or no-fat, aqueous-based food vehicle which comprises a fat replacer or fat mimetic; and from about 1 1 to about 20 weight percent of a flavor-encapsulating W/O/W multiple emulsion according to claim 22, said multiple emulsion including a concentrated solution of at least one aqueous soluble flavor.

42. A low-fat or no-fat food product according to claim 41, wherein said food product comprises from about 94 to about 98 weight percent of said aqueous-based food vehicle; and from about 2 to about 6 weight percent of said flavor-encapsulating multiple emulsion.

43. A low-fat or no-fat food product according to claim 12 wherein said viscous or pourable food product is a salad dressing and said concentrated aqueous flavor solution comprises a flavor selected from the group consisting of an egg flavor and dairy flavors.

* * * * *